Figure 1:
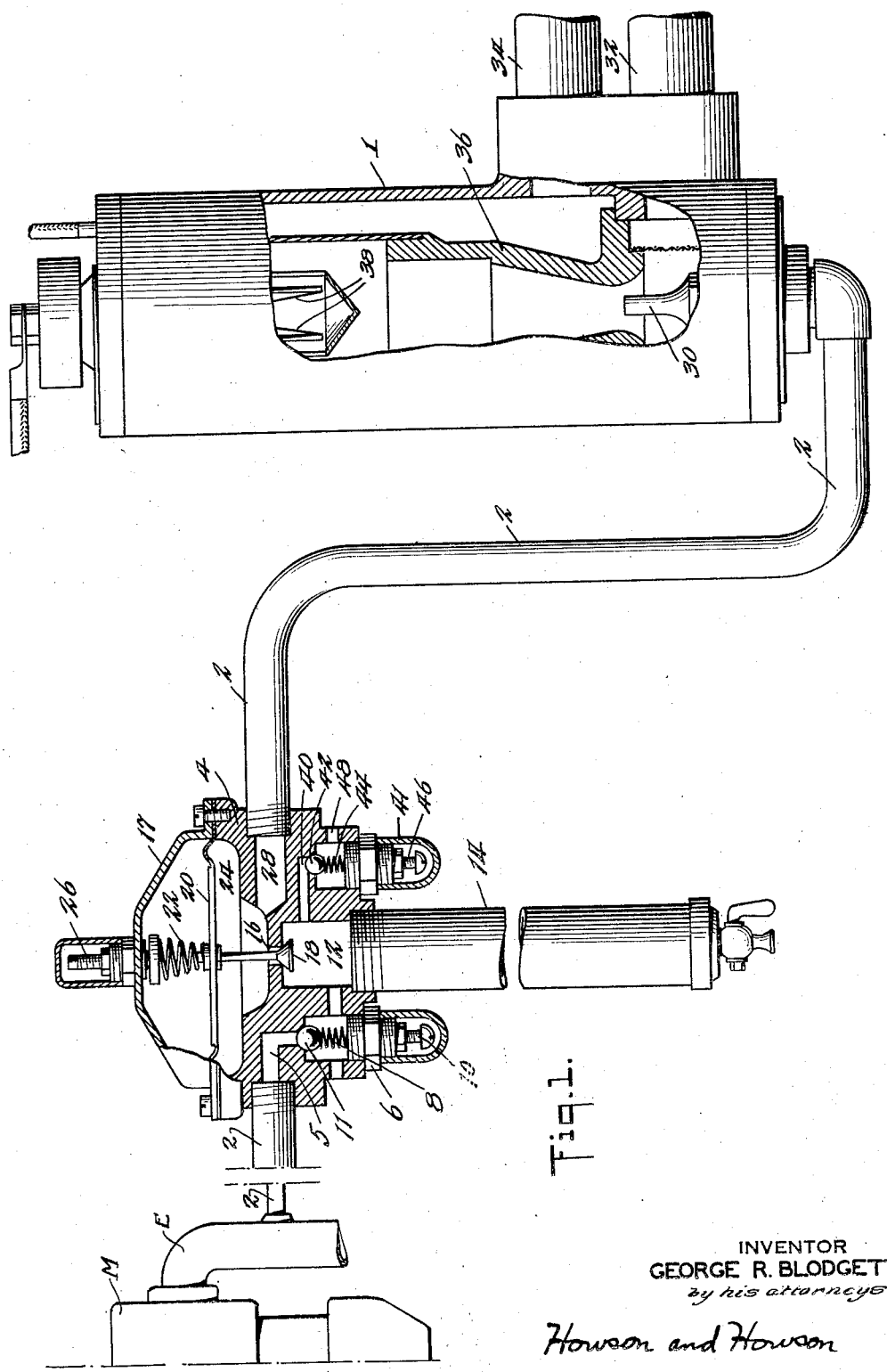

April 18, 1933. G. R. BLODGETT 1,904,819
PRESSURE AND FLOW CONTROL DEVICE FOR COMBUSTION INDICATORS
Filed March 6, 1931 2 Sheets-Sheet 1

INVENTOR
GEORGE R. BLODGETT
by his attorneys
Howson and Howson

April 18, 1933.    G. R. BLODGETT    1,904,819
PRESSURE AND FLOW CONTROL DEVICE FOR COMBUSTION INDICATORS
Filed March 6, 1931    2 Sheets-Sheet 2
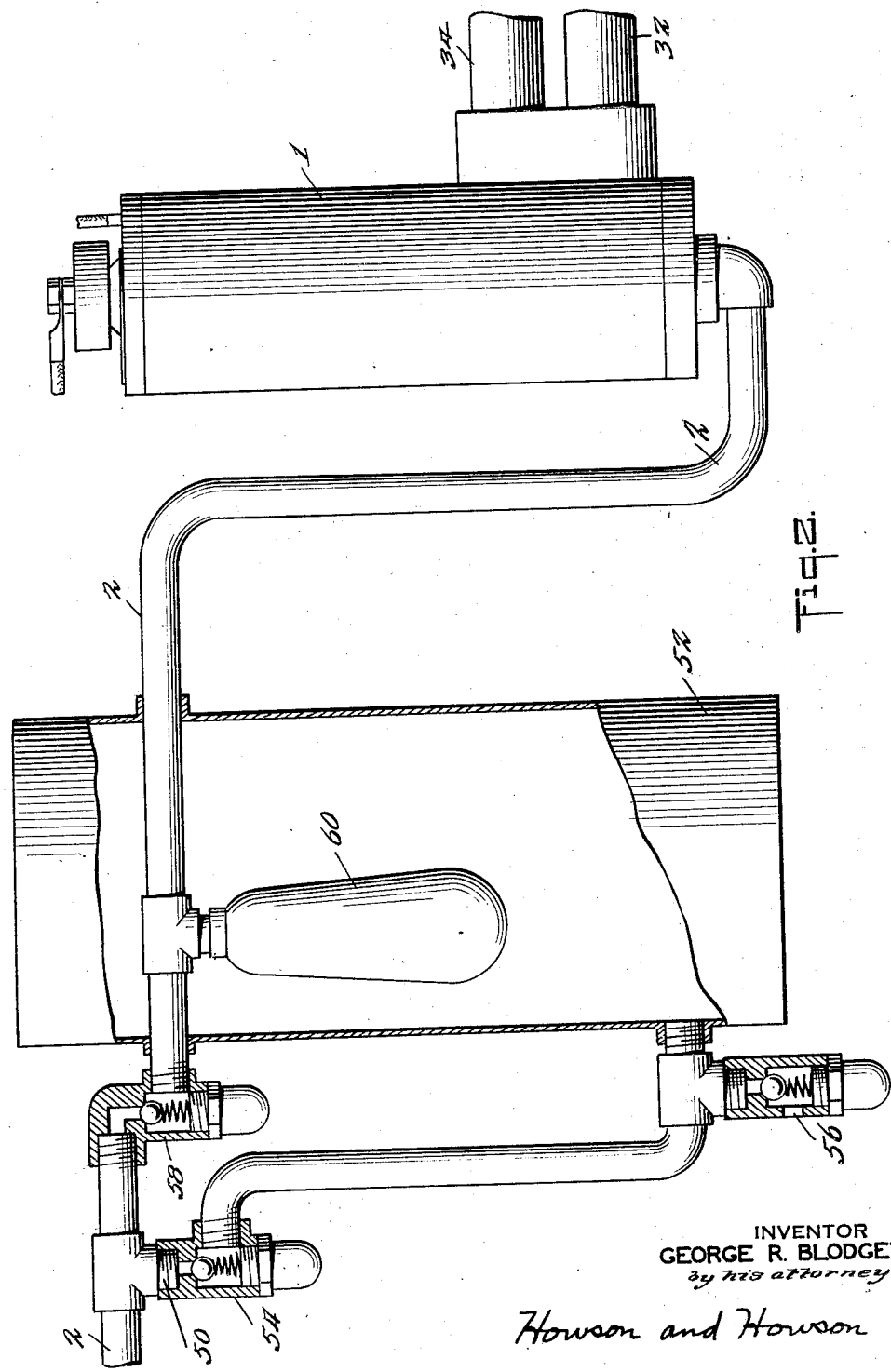
INVENTOR
GEORGE R. BLODGETT
by his attorneys
Howson and Howson Patented Apr. 18, 1933

1,904,819

UNITED STATES PATENT OFFICE

GEORGE R. BLODGETT, OF TOLEDO, OHIO, ASSIGNOR TO MOTO METER GAUGE & EQUIPMENT CORPORATION, OF TOLEDO, OHIO, A CORPORATION OF DELAWARE

PRESSURE AND FLOW CONTROL DEVICE FOR COMBUSTION INDICATORS

Application filed March 6, 1931. Serial No. 520,667.

This invention relates to devices, known as combustion indicators, for testing products of combustion to determine the completeness of the combustion taking place and more particularly for testing the exhaust of internal combustion engines to indicate the extent of the combustion of the fuel supplied.

One of the very important uses of a combustion indicator of the type described is to detect unequal distribution in the intake manifolds of internal combustion motors. By testing the exhaust from each individual cylinder of the motor it is possible to very readily determine the character of the mixture supplied each cylinder. In taking indications of the exhaust from a single cylinder, whether that is the sole cylinder of the motor or one cylinder of the multi-cylinder motor, the gas is ejected in an impulse or pressure wave after each combustion period and under some conditions the duration of such impulse or pressure wave is but 5 to 10% of the complete cycle of the motor. It can be readily seen that indications obtained from such impulses will differ considerably from indications obtained from a steady stream of gas of the same composition.

It is an object of this invention, therefore, to improve the operation of a combustion indicator of the type described by providing a continuous flow at uniform pressure thereto of the gas to be tested. It is also an object of this invention to provide an apparatus for use in connection with a combustion indicator of the type described which will provide a continuous flow at uniform pressure even when the combustion indicator is being used to test the exhaust gas discharged from a single cylinder whether the cylinder be the sole cylinder of the motor or one cylinder of a multi-cylinder motor.

In the drawings—

Figure 1 is a view partly in elevation and partly in section of an apparatus constructed in accordance with this invention; and Figure 2 is a similar view showing a modified construction.

In the drawings, referring particularly to Figure 1, the apparatus for providing the continuous flow at uniform pressure is shown in connection with a combustion indicator 1 of the type shown in my co-pending application Serial No. 507,697, filed January 9, 1931, which indicator 1 is supplied through pipe 2 with gas from the exhaust E of the internal combustion engine M. Where it is desired to test the exhaust gas from a single cylinder of a multi-cylinder engine the pipe 2 is connected to a sampling pipe which is inserted in the exhaust manifold near the exhaust valve of the cylinder whose exhaust gas is to be tested. The sampling pipe is placed with its open end directly facing the exhaust gas stream as the gas discharges from the motor cylinder. In the length of pipe 2 is placed a casing 4 having an inlet passage 5, flow through which is governed by a check valve 6, the pressure at which the check valve 6 operates being determined by the compression of the spring 8 which is adjusted by means of a set screw 10 and forces the ball valve 11 towards its seat. The check valve 6 controls the flow from passage 5 to a chamber 12 which is in open communication with a reservoir or container 14 detachably secured to the casing 4. Leading from the chamber 12 is a passage 16 controlled by a pressure regulating valve 17 comprising a valve 18 operated by a diaphragm 20 subjected on opposite sides to the opposing pressures of a spring 22 and the pressure in chamber 24. The pressure exerted by spring 22 may be adjusted by the set screw 26. From chamber 24 passage 28 establishes communication with the section of the pipe 2 connecting the casing 4 with the inlet nozzle 30 of the combustion indicator 1. The combustion indicator shown has the air inlet 32, discharge outlet 34, venturi 36 and catalyst wires 38, all as clearly shown and described in my prior application.

Connected to the chamber 12 by a passage 40 is a safety valve 41 comprising a ball valve 42 held seated by a spring 44, the pressure of which may be adjusted by the set screw 46. The safety valve 41 controls the flow from chamber 12 through passage 40 to the discharge port 48 and prevents an excess of pressure in reservoir 14.

In adjusting the device for use with the pipe 2 connected to the exhaust manifold E of the internal combustion motor M, the check valve 6 is opened permittng pressure to pass freely therethrough and the spring 22 of pressure regulating valve 17 is adjusted by means of the set screw 26 so as to maintain a pressure in chamber 24 and pipe 2 leading to the combustion indicator 1 equivalent, for example, to 2 inches of water. The check valve 6 is then adjusted so that less of the pressure wave is passed to the storage reservoir 14 at each impulse and the cutting down of the amount received at each pressure impulse is carried to the point where the diaphragm 20 of the reducing valve 17 just starts to flutter due to the pressure in chamber 24 being insufficient to maintain the valve 18 closed. The safety blow-off valve is then adjusted so that any pressure in the reservoir 14 materially in excess of the pressure for which the pressure regulating valve 17 is set will be discharged. These adjustments of the valves insure that only sufficient exhaust gas is taken from each pressure wave or impulse to maintain a supply in the storage reservoir 14 sufficient to last until the following pressure wave charges the reservoir 14, thus bringing to the combustion indicator 1 a specimen of exhaust gas from each combustion period of the cylinder which contains but very little or is contaminated but little by gas from previous pressure waves or combustion periods in the motor cylinder. Changes in the engine speed and consequent changes in the number of the pressure impulses in a given period or changes in the load on the engine and consequent changes in the maximum pressure of the pressure wave require changes in the adjustment of check valve 6 if the best conditions for the operation of the combustion indicator 1 are to be maintained. Different engines may necessitate changes in the capacity of the reservoir 14, it being desirable that it shall have a capacity sufficient only to maintain the supply to the combustion indicator from one pressure wave to the next.

In thus maintaining a constant flow from the storage reservoir 14 which is supplied to the combustion indicator 1 at a uniform pressure by means of the pressure regulating valve 17, there is provided a uniform flow through the nozzle 30 and venturi 36 and variations in the amount of air supplied to the gas to be tested are avoided inasmuch as the uniform flow through the nozzle 30 and venturi 36 causes a uniform flow through the air inlet 32 so that a proper mixture of the gas to be tested and air is uniformly supplied to the catalyst wires 38. As the flow is continuous the catalyst wires will maintain uniform heat except for the changes due to variations in the gas being tested and there will not be the intervals between the pressure waves during which the catalyst wires 38 will not be supplied with gas to be tested and may cool causing fluctuations of the meter indication.

Where the test is made of the exhaust of all cylinders of a multi-cylinder motor the pressure of the exhaust will at all times be above the pressure of the gas as it is fed to the nozzle 30 by the pressure regulating valve 17 and there is substantially a continuous flow from the exhaust so that in this case the check valve 6 and storage reservoir 14 might be dispensed with in an apparatus used for that purpose only, the pressure to the nozzle 30 being regulated to the desired pressure by the pressure regulating valve 17. The apparatus shown can be used without change or the check valve 6 can be opened in order to permit a free flow therethrough without in any other way changing the apparatus.

In the modified construction shown in Figure 2 the pipe 2 is connected to the exhaust manifold of the internal combustion motor as shown in Fig. 1 and to the combustion indicator 1 as in the other construction. Intermediate the ends of the pipe 2 there is placed a connection 50 leading to a closed receptacle 52, the connection 50 having a check valve 54 therein similar to the check valve 6 of Figure 1. Also connected to the connection 50 is a safety valve 56 which, in this case, is adjusted so as to maintain in the receptacle 52 a pressure equal to the pressure at which it is desired to feed the gas to the combustion indicator 1. In the length of the pipe 2 is a check valve 58 similar to check valve 54 and controlling the flow to a balloon or collapsible container 60 in open connection with pipe 2 and placed within the receptacle 52. In this construction pressure from the exhaust manifold will pass check valve 54 and through the connection 50 to receptacle 52. Owing to the safety valve 56 there will be maintained in the receptacle 52 a pressure, for example, of 2 inches of water. At the same time gas will be fed past check valve 58 to the balloon 60, the balloon 60 having a capacity similar to the capacity of the storage reservoir 14. Inasmuch as the pressure is supplied to the balloon 60 at each pressure wave faster than it is withdrawn through the nozzle 30 of the combustion indicator 1, the balloon 60 will be inflated at each pressure wave resulting from an explosion in the motor cylinder. Owing to the relatively small volume of the balloon 60 when inflated with respect to the volume of the receptacle 52 the inflation of the balloon 60 will make no appreciable variation in the pressure in the receptacle 52 and between the pressure waves from the exhaust manifold the presure in receptacle 52 will maintain a continuous discharge at a uniform pressure from the balloon 60 to the discharge nozzle 30 of the combustion indicator 1 so that the receptacle 52 and balloon 60 serve as a pressure regulating means. The balloon 60 may be formed of any suitable leak-proof material and it should be of such a size that it will have the desired capacity and yet will not of itself apply pressure to the gas contained therein.

I claim—

1. Means for supplying gas to a combustion indicator comprising a connection to a source of pulsating supply of gas for said indicator and means in said connection intermediate said source of supply and said indicator for converting said pulsating supply into a continuous supply, said means having a capacity limited substantially to the volume of gas taken by the indicator between successive impulses of the supply.

2. Means for supplying gas to a combustion indicator comprising a connection to a source of a pulsating supply of gas for said indicator, a container and pressure regulating means in said connection intermediate said source of supply and said indicator, and a check valve intermediate said source of supply and said container, said check valve restricting the supply to said container to the crests of the impulses.

3. Means for supplying gas to a combustion indicator comprising a connection to a source of supply of gas for said indicator, a container in said connection between said source of supply and indicator, a check valve governing the supply of gas to said container, means limiting the pressure in said container and pressure regulating means regulating the pressure of the supply from said container to said indicator.

4. Means for supplying gas to a combustion indicator comprising a connection to a source of supply of gas for said indicator, a receptacle connected to said connection, means maintaining a predetermined pressure in said receptacle, and a container connected to said connection and said indicator, said container being subjected to the pressure of said receptacle.

5. Means for suppling gas to a combustion indicator comprising a connection to a source of supply of gas for said indicator, a receptacle connected to said connection, means maintaining a predetermined pressure in said receptacle and a collapsible container connected to said connection and said indicator, said container being subjected to the pressure of said receptacle.

6. Means for supplying gas to a combustion indicator comprising a connection to a source of supply of gas for said indicator, a receptacle connected to said connection, means maintaining a predetermined pressure in said receptacle, a collapsible container connected to said connection and said indicator and subjected to the pressure of said receptacle and a check valve intermediate said connection and said container.

7. Means for supplying gas to a combustion indicator comprising a connection to a source of a pulsating supply of gas for said indicator, a container supplied from said connection and pressure regulating means controlling the supply from said container to the indicator.

8. Means for supplying gas to a combustion indicator comprising a connection to a source of supply of pulsating pressure, a container supplied from said connection when the pressure in said connection is above a predetermined amount and means supplying gas from said container to said indicator under uniform pressure.

9. Means for supplying gas to a combustion indicator comprising a connection to a source of supply, gas storage means intermittently supplied through said connection from the source of supply and means supplying gas from said storage means to said indicator under uniform pressure.

10. Means for supplying gas to a combustion indicator comprising a connection to a source of supply, gas storage means supplied from said connection, means supplying gas to said storage means when the pressure in said connection exceeds a predetermined amount and means supplying gas from said storage means to said indicator under uniform pressure.

11. Means for supplying gas to a combustion indicator comprising a connection to a source of supply of pulsating pressure, storage means receiving gas from said connection at the peaks of the pressure waves in said connection and means for supplying gas from said storage means to the combustion indicator continuously at a uniform pressure, said storage means having a capacity approximating the consumption by the indicator between impulses in the connection from the source of supply.

12. Means for supplying gas to a combustion indicator comprising a connection to a source of supply of pulsating pressure, storage means receiving gas from said connection at the peaks of the pressure waves in said connection and means for supplying gas from said storage means to the combustion indicator continuously at a uniform pressure.

In testimony whereof I have signed my name to this specification.

GEORGE R. BLODGETT.